June 24, 1924.

B. P. WELLAND

HORSESHOE

Filed Nov. 3, 1923

1,499,272

Inventor
Bardenes P. Welland,
By Geo. P. Kimmel
Attorney

Patented June 24, 1924.

1,499,272

UNITED STATES PATENT OFFICE.

BARDENES P. WELLAND, OF ALBERT LEA, MINNESOTA.

HORSESHOE.

Application filed November 3, 1923. Serial No. 672,537.

*To all whom it may concern:*

Be it known that I, BARDENES P. WELLAND, a citizen of the United States, residing at Albert Lea, in the county of Freeborn and State of Minnesota, have invented certain new and useful Improvements in Horseshoes, of which the following is a specification.

This invention relates to horseshoe attachments whereby the shoe is firmly held upon the hoof without the use of nails, rivets, or the like, and has for one of its objects to improve and simplify the construction and increase the efficiency and utility of devices of this character.

Another object of the invention is to provide a device of this character which may be adapted to horseshoes of various forms and sizes without material change either in the shoe or in the attachment.

With these and other objects in view the invention consists in certain novel features of construction as hereinafter shown and described and then specifically pointed out in the claims, and in the drawings illustrative of the preferred embodiment of the invention, Figure 1 is a front elevation, Fig. 2 is a side elevation, and Fig. 3 is a bottom plan view, of the hoof of a horse and a conventional horseshoe located thereon, with the improved shoe-holding means applied;

Figure 1:
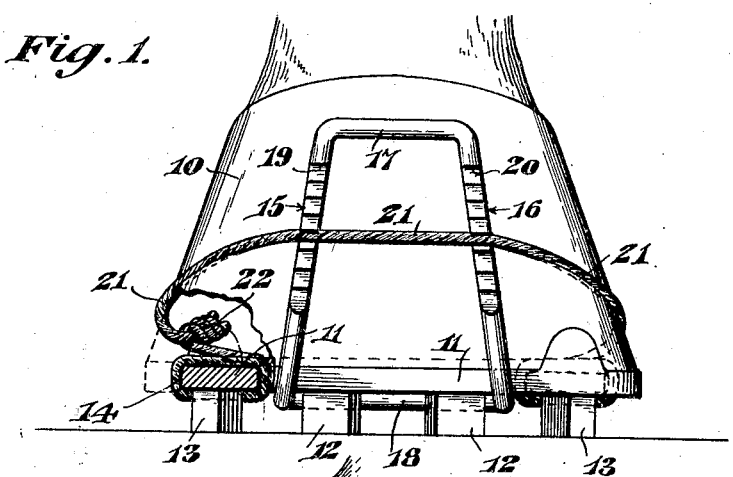
Figure 2:
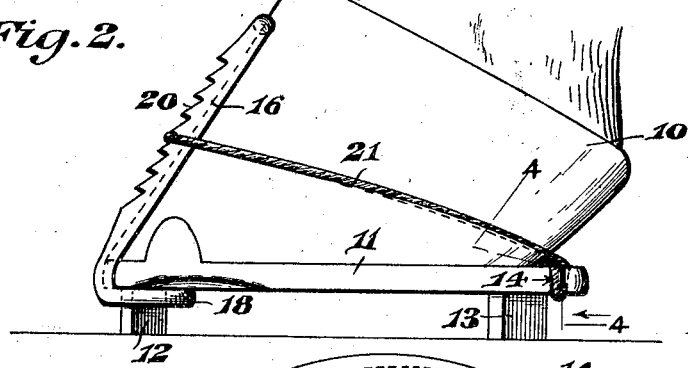
Figure 5:
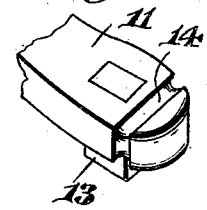
Fig. 5 is a perspective detail of one of the heel portions of the shoe.
Figure 3:
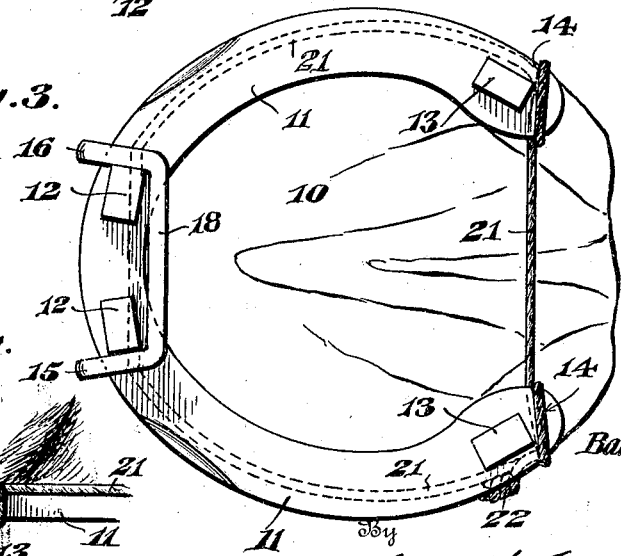
Figure 4:
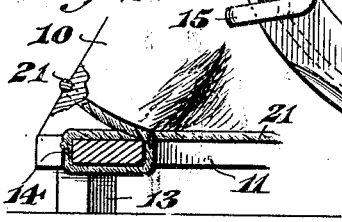
Fig. 4 is a sectional detail on the line 4—4 of Fig. 2.

The hoof is represented conventionally at 10 and the shoe as a whole at 11, and includes the depending toe calks 12, heel calks 13, and lateral guard lips of the usual construction. At each heel portion of the shoe an encompassing channel or groove 14 is produced, this being the only change in the shoe.

The improved attachment comprises a clip device formed of an endless member including spaced sides 15, 16, an upper end 17, and a lower end 18, the sides 15, 16 and the end 17 adapted to bear against the forward face of the hoof 10, and the end 18 bent at an angle to the side portions 15, 16 and adapted to pass beneath the shoe and around the toe calks 12, as shown. The side portions 15 and 16 of the clip are provided respectively with spaced transverse notches 19 and 20.

A flexible binding element 21, preferably of wire cable material as light as possible consistent with the strains to which it will be subjected, is engaged with the upper opposite series of notches 19 and 20 and passed thence over the sides of the hoof and looped around the heel portions of the shoe within the channels 14, and the terminals entwisted as shown at 22. By this means a relatively strong strain can be applied to the flexible element, but the strain can be materially increased and the shoe firmly bound upon the hoof by forcing the portion of the element 21 which engages in the notches toward the forward portion of the shoe, as will be obvious.

The range of the grip between the flexible element and the clip is great enough to adapt the device to shoes and hoofs of varying sizes.

The improved device is simple in construction, easily applied by any person without previous skill, and may be inexpensively manufactured and furnished to the trade in large quantities.

The preferred embodiment of the invention is disclosed in the drawings and set forth in the specification, but it will be understood that modifications within the scope of the claimed invention may be made in the construction without departing from the principle of the invention or sacrificing any of its advantages.

What I claim is:—

1. A horseshoe including downwardly directed toe calks and upwardly directed guards adapted to engage the sides of the hoof, the rear ends of the heel portions of the shoe having grooves therein, a clip device with notched side portions and adapted to bear against the forward face of the hoof, and a rearwardly directed loop to engage the toe calks, and a flexible clamping element engaging the notches of the clip device and the grooves of the shoe.

2. A device for securing a horse's shoe to the hoof comprising a clip device in the form of an endless member adapted to bear on the forward face of the hoof and with spaced side portions and transverse end portions, said side portions each having a plurality of spaced notches, and one end portion bent at an angle to the side portions and adapted to engage around the forward toe calks of the shoe, and a flexible binder element engaging the notches of the clip and the heel portions of the shoe.

3. A device for securing a horse's shoe to the hoof comprising a clip device in the form of an endless member adapted to bear on the forward face of the hoof and with spaced side portions and transverse end portions, said side portions each having a plurality of spaced notches, and one end portion bent at an angle to the side portions and adapted to engage around the toe calks of the shoe, a flexible binder element engaging the notches of the clip and the heel-portions of the shoe, and providing means whereby strain may be applied to said flexible element when manually actuated.

In testimony whereof, I affix my signature hereto.

BARDENES P. WELLAND.